(12) United States Patent
Wilson et al.

(10) Patent No.: US 12,097,555 B2
(45) Date of Patent: Sep. 24, 2024

(54) REPAIR ULTRA-LARGE CASTING

(71) Applicant: GM Global Technology Operations LLC, Detroit, MI (US)

(72) Inventors: Daniel J. Wilson, Linden, MI (US); Liang Wang, Rochester Hills, MI (US); Qigui Wang, Rochester Hills, MI (US); Devin R Hess, Clarkston, MI (US); Michelle A. Wood, Lake Orion, MI (US); Ronald C. Daul, Northville, MI (US); Ali Shabbir, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 203 days.

(21) Appl. No.: 17/735,337

(22) Filed: May 3, 2022

(65) Prior Publication Data
US 2023/0356293 A1   Nov. 9, 2023

(51) Int. Cl.
  *B23P 6/04*  (2006.01)
  *B22C 9/22*  (2006.01)
  *B22D 17/22* (2006.01)
  *B62D 25/20* (2006.01)

(52) U.S. Cl.
  CPC .............. *B22D 17/229* (2013.01); *B22C 9/22* (2013.01); *B23P 6/04* (2013.01); *B62D 25/2063* (2013.01)

(58) Field of Classification Search
  CPC .............. B23P 6/04; Y10T 29/49732; Y10T 29/49734; Y10T 29/49735; Y10T 29/49737; Y10T 29/49741
  USPC .............................. 29/402.11, 402.12, 402.13
  See application file for complete search history.

(56) References Cited

U.S. PATENT DOCUMENTS

| | | | |
|---|---|---|---|
| 2,321,629 A * | 6/1943 | Scott ................... | B23P 6/04 52/514 |
| 6,243,950 B1* | 6/2001 | Wachiner ............. | B62D 33/06 29/402.13 |

FOREIGN PATENT DOCUMENTS

DE      102021106754 B3 *   2/2022   ............. B62D 21/02

OTHER PUBLICATIONS

DE102021106754 English translation (Year: 2021).*

* cited by examiner

*Primary Examiner* — Joseph D. Pape
(74) *Attorney, Agent, or Firm* — Vivacqua Crane, PLLC

(57) ABSTRACT

A design for repair casting having a repairable ultra-large single-piece casting and a replacement part. The ultra-large single-piece casting includes a main body portion, at least one predefined replaceable portion integrally cast with the main body portion, and a cut-guide delineating the predefined replaceable portion from the main body portion. The cut-guide includes a continuous channel defined on an exterior surface of the single-piece casting. The cut-guide further includes a rib extending from a channel wall on the main body portion. A damaged replaceable portion is excisable from the main-body portion by cutting through the single-piece casting along the cut-guide. The excised damaged replaceable portion may be replaced with the replacement part, which has substantially the same geometry, dimensions, and mechanical properties as an undamaged replaceable portion. The replacement part may be joined to the main body portion by mechanical means or by welding.

20 Claims, 4 Drawing Sheets

REPAIR ULTRA-LARGE CASTING

INTRODUCTION

The present disclosure relates to ultra-large castings of vehicle body components, more particularly, to a design for repair ultra-large casting of a vehicle body component.

Traditional vehicle body designs include unibody designs and body-on-frame designs, which are made up of tens or hundreds of individual stamped panels and brackets, produced from a range of different materials that are joined together using welding, fasteners, or adhesives. In a unibody design, the body panels, floorboards, primary chassis structural support, and crash-protection elements are joined into a single piece or unit. In a body-on-frame design, the body panels and floorboard are joined and then assembled onto a support structure, such as a ladder frame, together with the crash-protection elements. The cutting, stamping, assembling, and joining of numerous stamped panels and other vehicle body components are labor and time extensive.

Modern vehicles, especially those of electric vehicles, are moving toward a simpler vehicle body design by utilizing ultra-large single-piece castings that may also serve as a load bearing structure of the vehicle body. These large single-piece castings are often referred to as giga-castings due to the huge size of the die-casting machines used to make these castings. Ultra-large castings allow vehicle bodies to be lighter and less complex to manufacture by replacing the large number of stamped panels required to form the vehicle body with a single-piece casting. As an example, an ultra-large single-piece casting of a vehicle body component can have a width of at least 0.8 meter (m), a length of at least 1 m, and a height of at least 0.25 m. An ultra-large single-piece die cast vehicle body component may have a projected area of at least 0.3 $m^2$ on a parting plane, which is typically normal to a die injection direction in a high pressure die casting.

Ultra-large castings of vehicle body components are manufactured by high pressure injection of an aluminum-silicon alloy in a die cavity. An advantage of die casting is that the die casting process can form light weight and high strength components with intricate and complex details; thus, enabling manufactures of functional components that may act as a load bearing structure. One example is that of a battery tray having intricate geometry to house rechargeable batteries and serves as a stressed member of the vehicle body structure.

One disadvantage of using an ultra-large casting in manufacturing a vehicle body is that the entire single-piece casting is typically removed and replaced when the casting is damaged. Thus, while the current method of repairing ultra-large single-piece castings achieve their intended purpose, there is a need for an ultra-large casting that is designed to be repairable.

SUMMARY

According to several aspects, a repairable casting is disclosed. The repairable casting includes a single-piece casting having a main body portion, at least one replaceable portion extending integrally from the main body portion, and a cut-guide delineating the replaceable portion from the main body portion. The cut-guide is defined by a channel. The repairable casting also includes a replacement part having a same geometry and dimensions as the at least one replaceable portion.

In an additional aspect of the present disclosure, the replaceable portion is excisable from the main body portion by cutting through the single-piece casting along the cut-guide. The replacement part is attachable to the main body portion to replace the excised replaceable portion.

In another aspect of the present disclosure, the channel is a continuous channel defining a continuous border between the at least one replaceable portion and the main body portion. The continuous channel is defined on an exterior surface of the single-piece casting and includes a curved channel bottom.

In another aspect of the present disclosure, the exterior surface of the casting defines at least one rib immediately adjacent the continuous channel. The at least one rib is defined on the main-body portion.

In another aspect of the present disclosure, the least one rib includes a mating surface. The replacement part includes an external surface defining a rib having a mating surface configured to be joinable with the mating surface of the at least one rib defined on the main-body portion.

In another aspect of the present disclosure, the at least one rib defines a plurality of bolt through-hole. The rib of the replacement part defines a plurality of bolt through-holes. The plurality of bolt through-holes of the rib of the replacement part aligns with the plurality of bolt through-holes of the main-body portion when the replacement part is arranged for assembly onto the main-body portion.

According to several aspects, an ultra-large single-piece repairable casting for a vehicle is disclosed. The casting includes a main body portion, at least one replaceable portion integrally cast with the main body portion, and a cut-guide delineating the replaceable portion from the main body portion. The casting includes a length (L) of greater than 1 meter (m), a width (W) of greater than 0.8 m, and an average height of about 0.25 m.

In an additional aspect of the present disclosure, the cut-guide is a continuous channel defined on an exterior surface of the ultra-large single-piece repairable casting. The cut-guide includes a raised rib extending from a channel wall of the continuous channel on the main body portion. The raised rib defines at least one of a plurality of bolt through-holes, a locating pin, and a locating pin receiver.

According to several aspects, a design for repair die-casting is disclosed. The die-casting includes a single-piece die casting having a main body portion and a predefined replaceable portion extending integrally from the main body portion. The die-casting also includes a cast replacement part having substantially a same geometry, a same dimension, and a same mechanical property as the predefined replaceable portion.

In an additional aspect of the present disclosure, the single-piece die casting includes a cut-guide delineating the replaceable portion from the main body portion. The cut-guide includes a continuous rib defined on an exterior surface of the single-piece die casting. The cut-guide further includes a continuous channel defined on the exterior surface of the single-piece die casting immediately adjacent the continuous rib. The continuous rib is defined on the main-body portion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale, and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
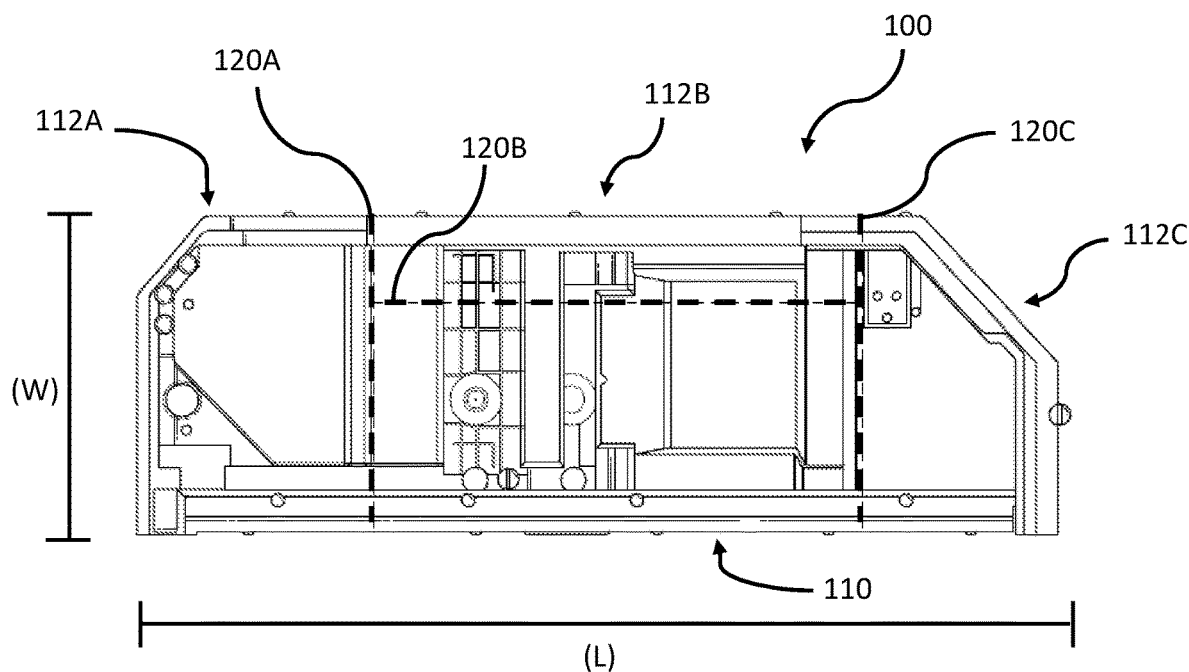
FIG. 1 is a bottom view of an ultra-large single-piece floor casting of a vehicle, according to an exemplary embodiment.

FIG. 1 is a bottom view of an example of a design for repair ultra-large single-piece casting 100. The exemplary ultra-large single-piece casting 100 shown is that of a complex floor casting of a vehicle body, also referred to as floor casting 100. The floor casting 100 includes a length (L) of greater than 2 meters (m), a width (W) of greater than 0.8 m, and an average height (H) of about 0.25 m. The floor casting is manufactured by casting an aluminum-silicon (Al—Si) alloy using a 5000 ton or greater capacity die-casting press. The molten Al—Si alloy is injected into a reusable 2-piece die at approximately 90 degrees to a parting plane of the 2-piece die. The parting plane is the plane where the 2-piece die is separated into 2-halves for the removal of the casting. The solidified ultra-large floor casting 100 is removed from the die, machined to design dimensions and tolerances, and heat treated as necessary to desired specifications.

It should be appreciated that ultra-large single-piece castings are not limited to ultra-large floor castings but may include any other die-cast components having a projected area of at least 0.3 m² on a projection plane parallel to the parting plane of the 2-piece die. Additionally, ultra-large single-piece castings may include die-castings and other forms of castings that have dimensions of at least 1.0 m in length, at least 0.8 m in width, and at least 0.25 m in average height.

The ultra-large floor casting 100 is an ultra-large single-piece casting having a plurality of predefined replaceable portions, or segments, 110, 112A, 112B, 12C delineated by cut-guides 120A, 120B, 120C. In other words, the pre-defined portions 110, 112A, 112B, 12C are partitioned by the cut-guides 120A, 120B, 120C. In the embodiment shown, the plurality of predefined portions include a main body portion 110 integrally cast with a plurality of replaceable portions 112A, 112B, 112C. The replaceable portions 112A, 112B, 112C may be selectively removed, or excised, from the main body portion 110 and adjacent replaceable portions 112A, 112B, 112C by cutting through the floor casting 100 along the appropriate cut-guides 120A, 120B, 120C. An advantage to this design is that any damaged replaceable portion 112A, 112B, 112C can be removed from the main body portion 110 by cutting along the respective cut-guides 120A, 120B, 120C and replaced with a replacement part, thereby eliminating the need for removing and replacing the entire ultra-large floor casting 100 from a completed vehicle. A replacement part, having the same geometry, dimensions, and mechanical properties of a corresponding removed replaceable portion 112A, 112B, 112C, may be attached to the main body portion 110 by mechanical means, welds, or structural adhesives.

In designing the repairable ultra-large floor casting, the floor casting 100 may be analyzed to identify sections or areas that may be susceptible to damage when encountering road hazards such as pot-holes or foreign objects that are typically found on roadways or sustain damage when colliding with another vehicle. Such analysis may be done by crash simulations of the floor casting in collision simulations, finite element analysis, design features, stress testing, customer feedback, and other factors. Adjacent identified sections or areas may be grouped and delineated by cut-guides 120A, 120B, 120C into replaceable portions 112A, 112B, 112C. It is appreciated that the floor casting 100 may include any number of replaceable portions and is not limited to the three (3) as shown.

Figure 2:
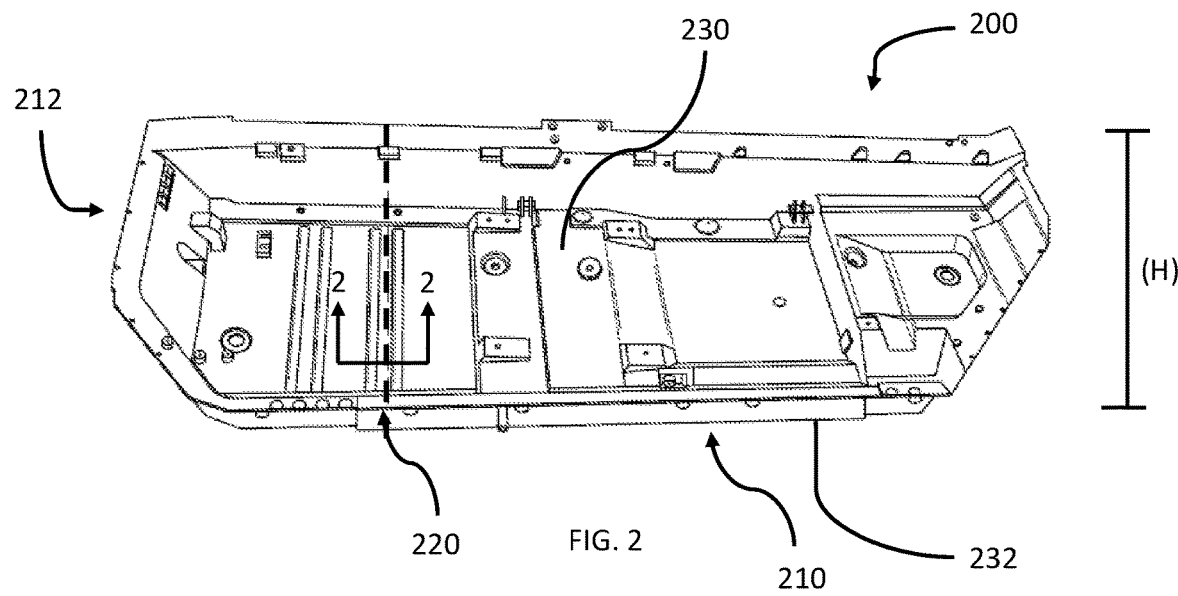
FIG. 2 is a perspective top view of the floor casting of FIG. 1.

Referring to FIG. 2 is a perspective top view of an ultra-large floor casting 200 having a main body portion 210 and a single replaceable portion 212 integral with the main body portion 210. The ultra-large floor casting 200 includes an interior surface 230, an exterior surface 232 opposite the interior surface 230, and a thickness extending between the interior surface 230 and the exterior surface 232. When the ultra-large floor casting 200 is assembled into a vehicle body, the interior surface 230 is facing toward an interior of the passenger compartment and the exterior surface 232 is facing toward an exterior environment of the vehicle. The ultra-large floor casting 200 includes the replaceable portion 212 integrally cast with the main body portion 210 as a single-piece die casting. The replaceable portion 212 is defined by a cut-guide 220 delineating the replaceable portion 212 from the main body portion 210. A damaged replaceable portion 212 is removeable from the main body portion 210 by cutting along the cut-guide 220 by a hand or electric saw, laser, electronic beam, waterjet, and any other cutting means effective to cut through the die-casting.

Figure 3:
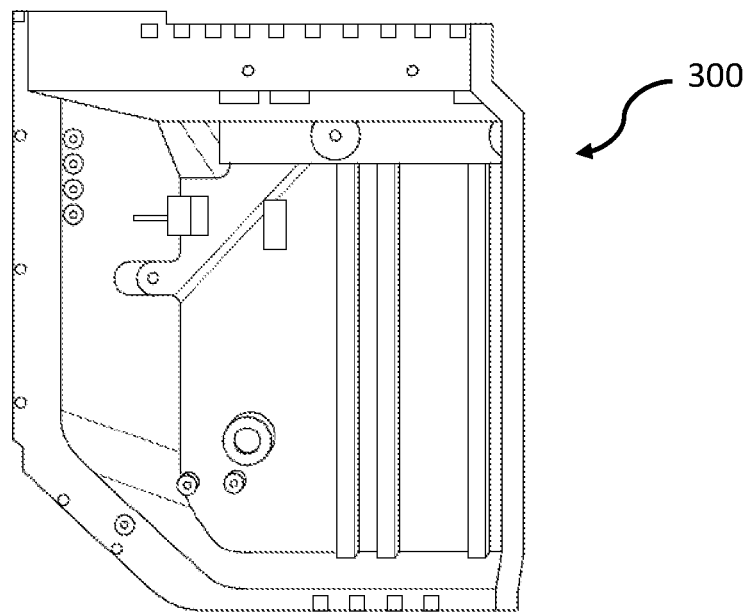
FIG. 3 is a top view of a replacement part for a predefined replaceable portion of the floor casting of FIG. 1, according to an exemplary embodiment.
Figure 4:
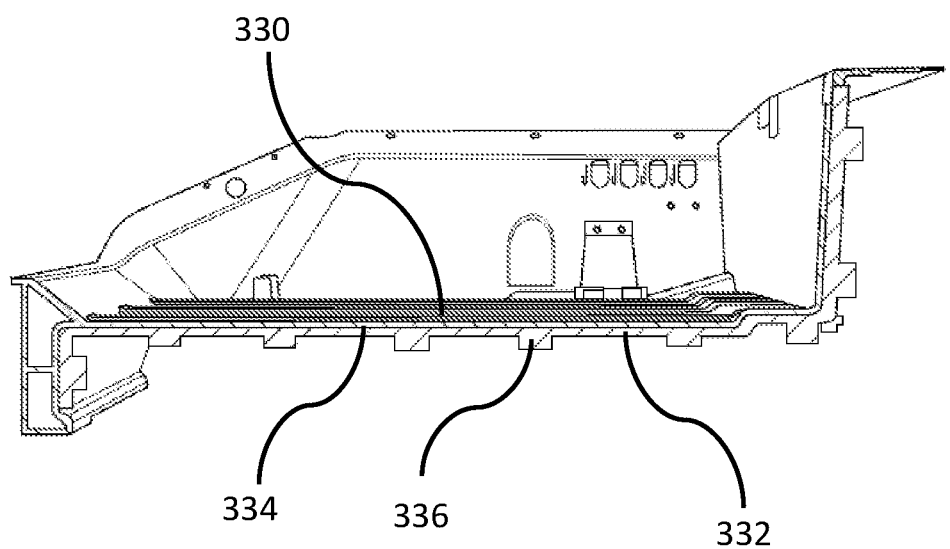
FIG. 4 is an end view of the replacement part of FIG. 3.

FIG. 3 is a top view of the replacement part 300 and FIG. 4 is an end view of the replacement part 300. The replacement part 300 includes the substantially the same geometry, dimensions, and mechanical properties as that of a corresponding undamaged replaceable portion 212. Referring to FIG. 4, the replacement part 300 includes an interior surface 330, an exterior surface 332 opposite the interior surface 330, and a mating surface 334 extending between the interior surface 330 and the exterior surface 332. The mating surface 334 defines a plurality of flanges 336 or bosses 336 configured to engage with a mating surface of the main body portion 210 when the replacement part 300 is joined to the main body portion 210. Alternatively, in lieu of or in combination with the plurality of flanges 336 and bosses 336, the mating surface 334 cooperates with the exterior surface 332 to define a continuous rib configured to engage with a corresponding continuous rib defined on mating surface of the main body portion 210.

Figure 5:
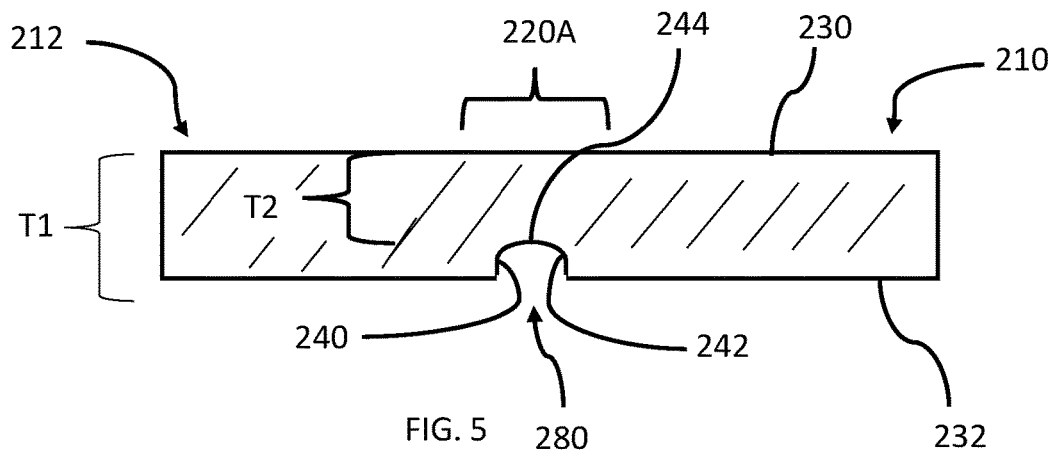
FIG. 5 is a diagrammatic cross-sectional view of an embodiment of a cut-guide along line 2-2 of FIG. 2.

Referring to FIG. 5 is a diagrammatic cross-sectional view of the cut-guide 220A through section line 2-2 of FIG. 2, according to an embodiment. The cross-sectional view shows the interior surface 230, the opposite facing exterior surface 232, and a thickness T1 between the interior surface 230 and the exterior surface 232. Referring to FIG. 2 and FIG. 5, the cut-guide 220 is a continuous channel 280 defined by the exterior surface 232 of the floor casting 200 delineating the replaceable portion 212 from the main body portion 210. The continuous channel 280 includes a first channel wall 240 defined on the replaceable first portion 212, a second channel wall 242 defined on the main body portion 210 facing the first channel wall 240, and a channel bottom 244 connecting first channel wall 240 and the second channel wall 242. The channel bottom 244 is curved and contains no sharp corners to avoid stress fractures along the cut-guide 220. A second thickness T2 is defined between the channel bottom 244 and the interior surface 230. It is preferable that T2 is at least 90 percent the thickness of T1 to minimize stress along the cut-guide 220. In other words, the depth of the channel 280 is less than 10 percent the thickness (T1) of the floor casting 200 across the cut-guide 220.

Figure 6:
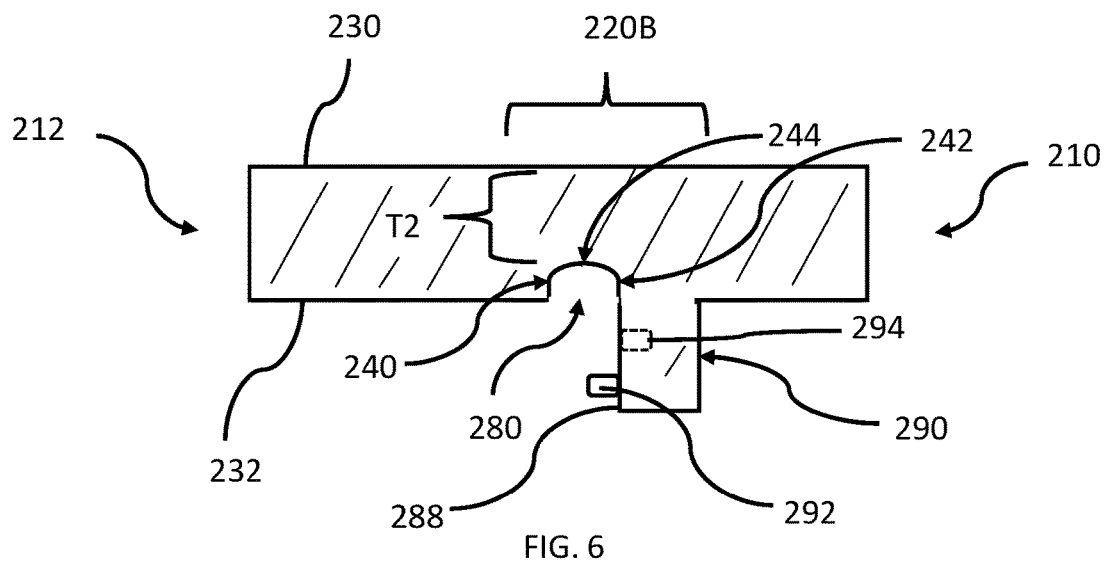
FIG. 6 is a diagrammatic cross-sectional view of another embodiment of the cut-guide along line 2-2 of FIG. 2.

Referring to FIG. 6 is a diagrammatic cross-sectional view of the cut-guide 220B through section line 2-2 of FIG. 2, according to another embodiment. The cut-guide 220B includes a continuous channel 280 defined by the exterior surface 232 of the floor casting 200 delineating the replaceable portion 212 from the main body 210 and other replaceable portions. The continuous channel 280 includes a first channel wall 240 defined on the replaceable first portion 212, a second channel wall 242 defined on the main body portion 210 facing the first channel wall 240, and a channel bottom 244 connecting first channel wall 240 and the second channel wall 242. A second thickness T2 is defined between the channel bottom 244 and the interior surface 230. The second channel wall 242 continues to extend outward defining a mating surface 288 of a rib 290. The mating surface 288 is facing the replaceable first portion 212 and defines at least one of a mating pin 292 and a mating pin receiver 294. The purposes of the mating pin 292 and mating receiver 294 are described below in detail with reference to FIG. 9.

Figure 7:
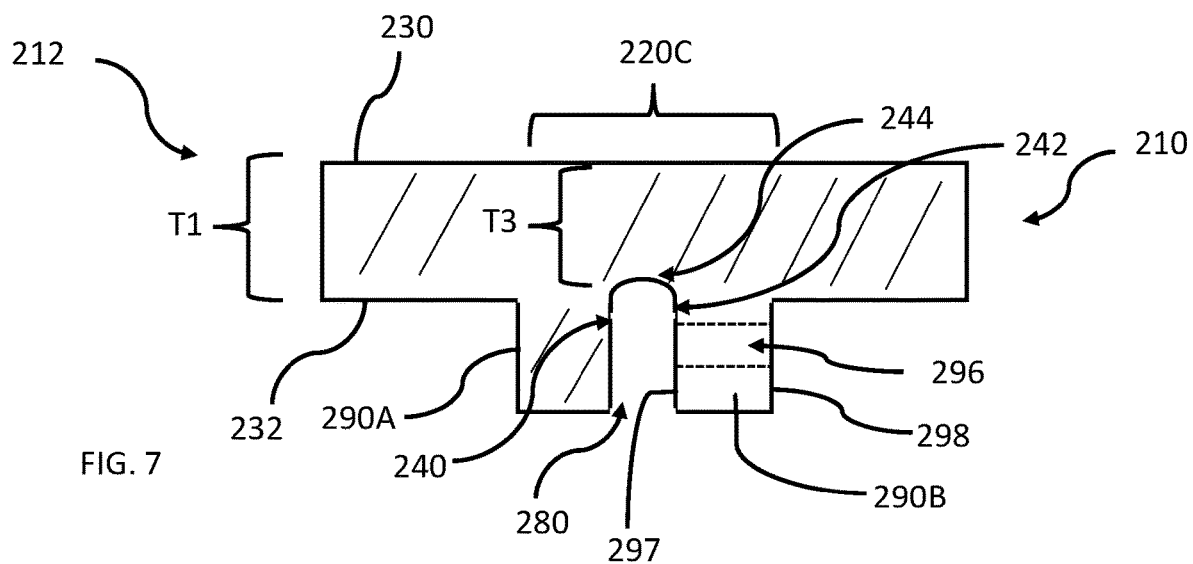
FIG. 7 is a diagrammatic cross-sectional view of yet another embodiment of the cut-guide along line 2-2 of FIG. 2.

Referring to FIG. 7 is a diagrammatic cross-sectional view of the cut-guide 220C through section line 2-2 of FIG. 2, according to yet another embodiment. The cut-guide 220C includes a continuous channel 280 defined between a pair of protruding ribs 290A, 290B defined by the exterior surface 232 of the floor casting 200. The cut-guide 220C delineates the replaceable portion 212 from the main body portion 210. The continuous channel 280 includes a first channel wall 240 defined on the replaceable portion 212, a second channel wall 242 defined on the main body portion 210 facing the first channel wall 240, and a channel bottom 244 connecting first channel wall 240 and the second channel wall 242. A thickness (T3) defined between the channel bottom 244 and the interior surface 230 is at least 90% of or equal to T1. The second rib 290B defines a both through-hole 296 extending from a rib mating surface 297 and a rib outer surface 298.

In each of the embodiments of the cut-guide 220A, 220B, 220C shown in FIGS. 5-7, a damaged replaceable portion 212 may be excised from the main body portion 210 by cutting along the channel 280 through the thickness T2 or T3 with the first channel wall 240 and the second channel wall 242 functioning as a guide for the cutting instrument. An advantage of defining the channel 280 on the exterior surface 232 of the floor casting 200 is that the replaceable portion 212 may be excised from the main body portion 210 from the exterior of the vehicle rather than through the interior cabin of the vehicle.

Figure 8:
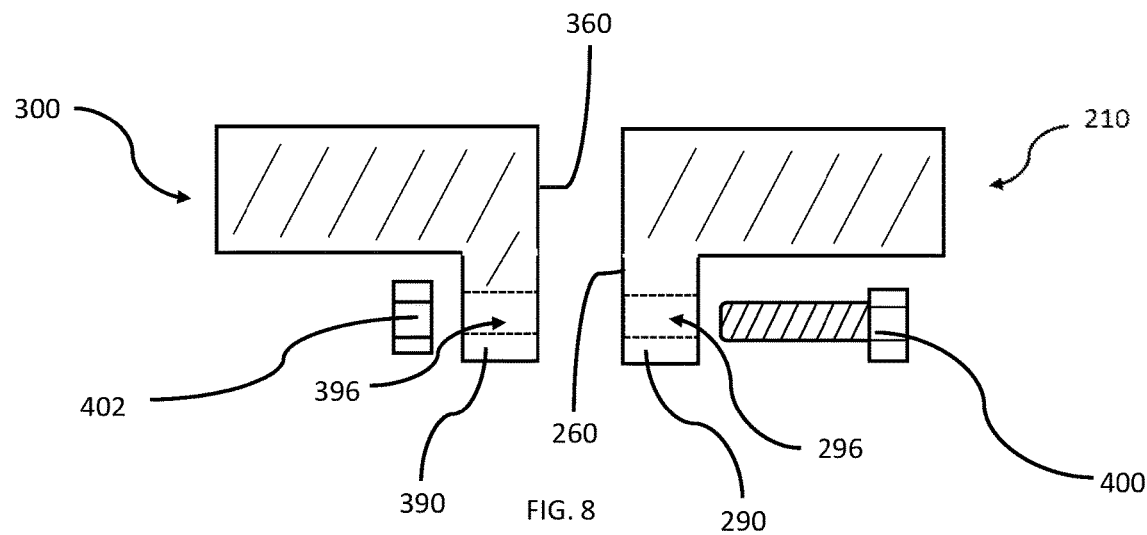
FIG. 8 is a diagrammatic cross-sectional view of a replacement part arranged for joining with a main-body portion of the floor casting, according to an exemplary embodiment.

Referring to FIG. 8, is a cross-section of the main body portion 210 after the replaceable portion 212 has been excised. The main body portion 210 is shown arranged for assembly to a cross-section of the replacement part 300. A cut-interface 260, or mating surface 260, of the main-body portion 210 is machined flush by grinding for preparation to mate and joined to a mating surface 360 of the replacement part 300. In the embodiment shown, the main body portion 210 includes a rib 290 having a through-hole 296 defined therethrough. The replacement part 300 includes a flange 390 or a continuous rib 390 having a bolt through-hole 396 defined therethrough corresponding to the bolt through-hole 296 of the main body portion 210 when assembled. The replacement part 300 and the main body portion 210 may be mated and jointed by a bolt 400 and a corresponding nut 402.

Figure 9:
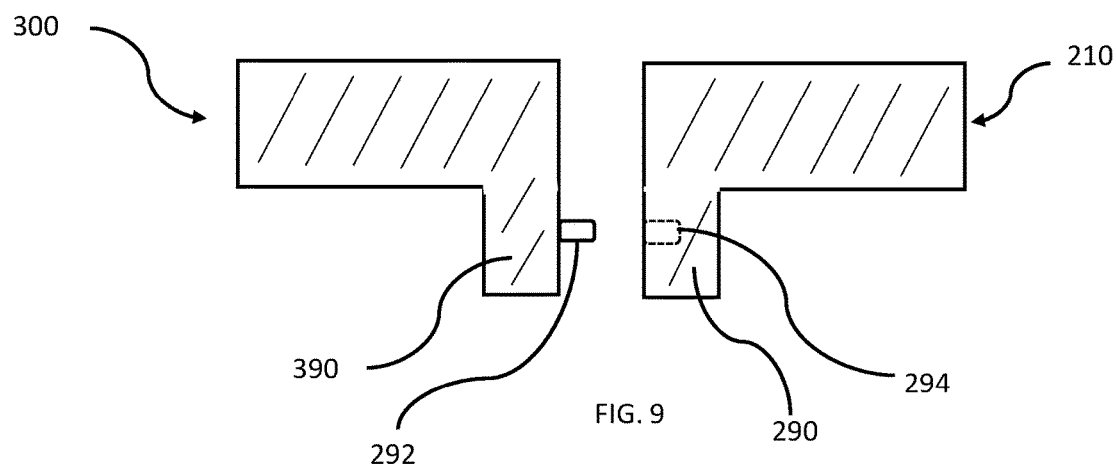
FIG. 9 is a diagrammatic cross-sectional view of a replacement part arranged for joining with a main-body portion of floor casting, according to another exemplary embodiment.

Referring to FIG. 9, is a cross-section of the main body portion 210 after the replaceable portion 212 has been excised. The main body portion 210 is shown arranged for assembly to a cross-section of the replacement part 300. In the embodiment shown, the main body portion includes a rib 290 defining a locating pin recess 294 on the mating surface of the rib 290, and the replacement part 300 includes a rib 390, or flange 390, having a corresponding locating pin 292. When arranged and positioned for the main body portion 210 to join the replacement part 300, the locating pin 292 align is received in the locating pin receiver 294 to guide the replacement part 300 into proper position. In this embodiment, the replacement part 300 may be joined to the main body portion 210 by welding when the replacement part 300 is a load-bearing member, or the replacement part 300 may be joined to the main body portion 210 by structural epoxy when the replacement part 300 is a non-load bearing member.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A repairable casting, comprising:
   a single-piece casting having a main body portion, at least one replaceable portion extending integrally from the main body portion, and a cut-guide delineating the replaceable portion from the main body portion; and
   a replacement part having a same geometry and dimensions as the at least one replaceable portion;
   wherein the replaceable portion is excisable from the main body portion by cutting through the single-piece casting along the cut-guide;
   wherein the replacement part is attachable to the main body portion to replace an excised replaceable portion; and
   wherein the cut-guide is defined by a channel.

2. The repairable casting of claim 1, wherein the channel is a continuous channel defining a continuous border between the at least one replaceable portion and the main body portion.

3. The repairable casting of claim 2, wherein the continuous channel is defined on an exterior surface of the single-piece casting.

4. The repairable casting of claim 3, wherein the continuous channel includes a curved channel bottom.

5. The repairable casting of claim 3, wherein the exterior surface defines at least one rib immediately adjacent the continuous channel.

6. The repairable casting of claim 5, wherein the at least one rib is defined on the main body portion.

7. The repairable casting of claim 6,
wherein the at least one rib defined on the main-body portion includes a mating surface,
wherein the replacement part includes an external surface defining a rib having a mating surface configured to be joinable with the mating surface of the at least one rib defined on the main body portion.

8. The repairable casting of claim 7,
wherein the at least one rib defined on the main body portion defines a plurality of bolt through-holes;
wherein the rib of the replacement part defines a plurality of bolt through-holes; and
wherein the plurality of bolt through-holes of the rib of the replacement part aligns with the plurality of bolt through-holes of the main-body portion when the replacement part is arranged for assembly onto the main-body portion.

9. A single-piece repairable casting for a vehicle, comprising:
a main body portion;
at least one replaceable portion integrally cast with the main body portion;
a cut-guide delineating the replaceable portion from the main body portion;
a length (L) of greater than 1 meter (m);
a width (W) of greater than 0.8 m; and
an average height of about 0.25 m; and
wherein the cut-guide is a continuous channel defined on an exterior surface of the single-piece repairable casting.

10. The single-piece repairable casting of claim 9, wherein the cut-guide includes a raised rib extending from a channel wall of the continuous channel on the main body portion.

11. The single-piece repairable casting of claim 10, wherein the raised rib defines at least one of a plurality of bolt through-holes, a locating pin, and a locating pin receiver.

12. A design for repair die-casting, comprising:
a single-piece die casting including a main body portion and a predefined replaceable portion extending integrally from the main body portion; and
a cast replacement part having substantially a same geometry, a same dimension, and a same mechanical property as the predefined replaceable portion;
wherein the single-piece die casting further includes a cut-guide delineating the replaceable portion from the main body portion; and
wherein the cut-guide comprises a continuous rib defined on an exterior surface of the single-piece die casting.

13. The design for repair die-casting of claim 12, wherein the cut-guide further comprises a continuous channel defined on the exterior surface of the single-piece die casting immediately adjacent the continuous rib.

14. The design for repair die-casting of claim 13, wherein the continuous rib is defined on the main body portion.

15. The design for repair die-casting of claim 12, wherein the single-piece die casting is a vehicle component.

16. The design for repair die-casting of claim 15, wherein the vehicle component includes:
a length (L) of greater than 1 meter (m);
a width (W) of greater than 0.8 m; and
an average height of about 0.25 m.

17. The design for repair die-casting of claim 15, wherein the vehicle component is a battery tray.

18. The design for repair die-casting of claim 15, wherein the continuous rib defines a plurality of bolt through-holes.

19. The design for repair die-casting of claim 15, wherein the continuous rib defines a locating pin.

20. The design for repair die-casting of claim 15, wherein the continuous rib defines a locating pin receiver.

* * * * *